April 1, 1930.   O. GRAETZER   1,752,986
AUTOMATIC CISTERN FOR LIQUIDS
Filed Jan. 19, 1929   2 Sheets-Sheet 1
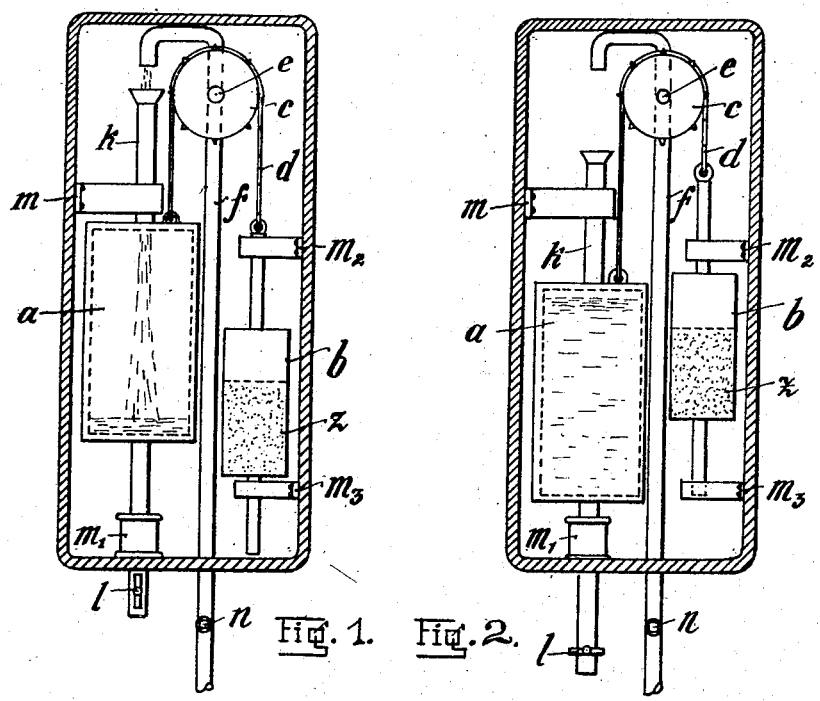
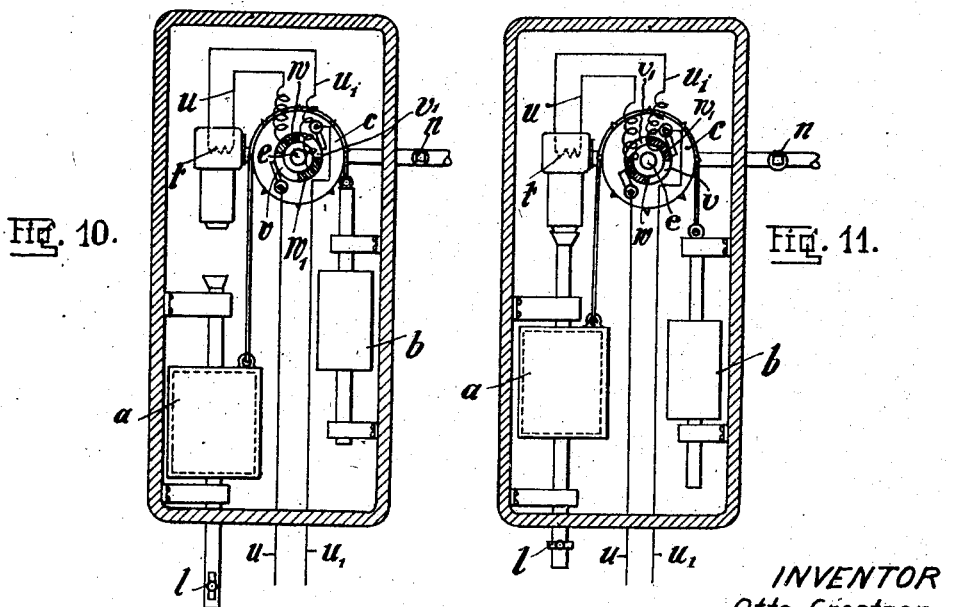
INVENTOR
Otto Graetzer
by
ATTORNEY

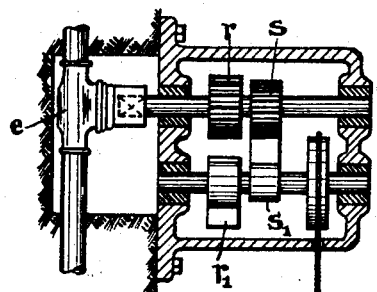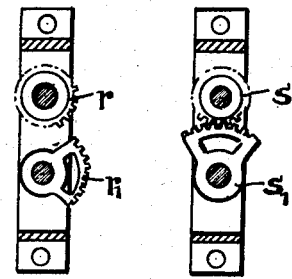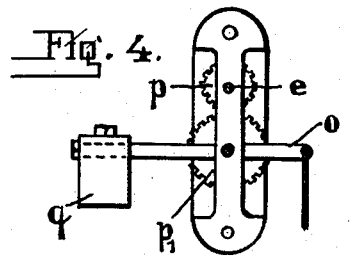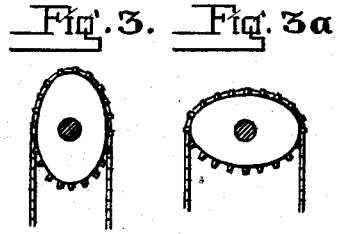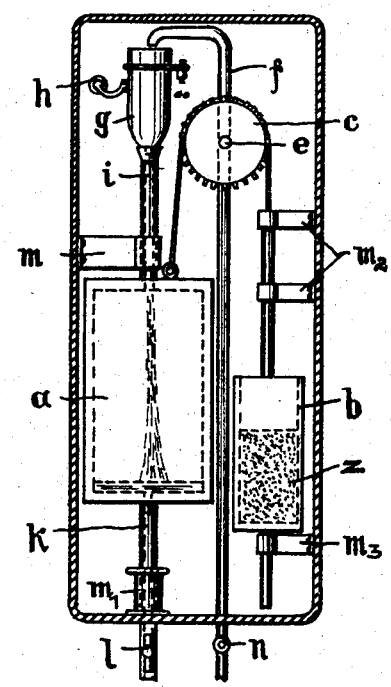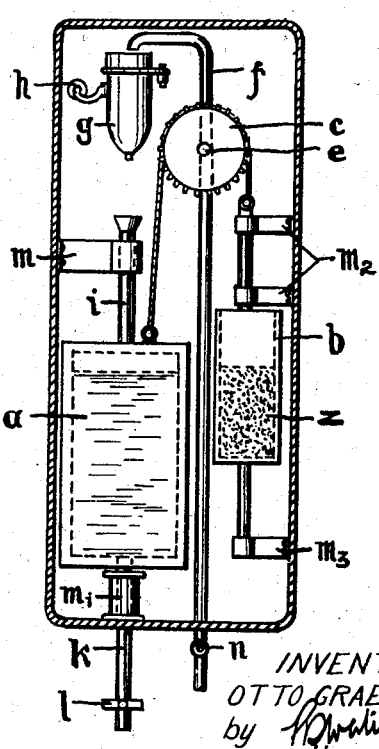

Patented Apr. 1, 1930

1,752,986

UNITED STATES PATENT OFFICE

OTTO GRAETZER, OF ZURICH-ZOLLIKON, SWITZERLAND

AUTOMATIC CISTERN FOR LIQUIDS

Application filed January 19, 1929, Serial No. 333,734, and in Switzerland January 21, 1928.

In the cases of liquids which are only available in comparatively small incoming quantities, but which have to be used in large quantities when required, it is customary to collect this small incoming quantity of liquid in a cistern not under pressure. When the cistern is filled the liquid inlet is closed by the known float valve, and opened on emptying (flushing cisterns or closets). The float valves have the great disadvantage that part of the float is directly in the liquid and other parts are exposed to the moist air in the float cistern. Owing to the chemical constituents in the liquid the parts of the float which are in the liquid are in a short time attacked; the parts outside the liquid, but in the float cistern, are attacked by the moist air. The operation of the float as a shut-off valve is impaired and the cistern begins to "run", that is, the cistern does not properly collect the incoming liquid but the liquid flows uninterruptedly into and out of the cistern.

A waste of the liquid is the result; a sufficient collection of the liquid in the cistern is not possible, and the object of the cistern is not fulfilled. Frequent and expensive repairs are a further consequence.

These defects are overcome by the present invention. The invention consists in a movable liquid cistern itself acting as a regulating organ for the opening and closing of the inlet valve to the cistern.

Special advantages occur when such an automatic cistern of particular construction is used as an electrical hot-water cistern. The heating of known constructions of these cisterns takes place either by electrodes or by heating coils fitted inside the hot-water cistern and the cistern is always under water pressure, or the hot water flowing out of an intermediate heater into the cistern is regulated by a float valve, in the same way as the cisterns without heating, so that the intermediate heater is also more or less under water pressure.

These electrical hot water cisterns have also serious technical as well as economical disadvantages. With the first-mentioned constructional form it takes many hours before the water is heated. If more hot water is used than the cistern contains, then it will again take several hours before the water is heated, whereas, on the contrary, if the water in the cistern is not required or only partly required, the electric current for the water not used must still be consumed. Maximum cutouts are necessary to prevent excessive heating.

Owing to the deposit formed on the heating pipes, the output continually decreases and can only be maintained by expensive repairs. The cleaning of the cistern necessary on hygienic grounds is neglected as this can only be carried out by experts and is, at the same time, expensive. The incoming cold water cools down the hot water still in the cistern and finally current shocks take place owing to the automatic switching in and out.

Hot water cisterns fed by means of intermediate heaters and float valves have never come into general use as the following defects appertain thereto:—as already mentioned all float valves are more or less uncertain in their action and take up a great deal of room in the cistern, so that in consequence the cistern can only be partly filled with hot water. The metal parts of the float lie partly in the hot water and conduct the heat away, and at the same time the air space in the cistern cools the water considerably.

Owing to the fact that the heater is connected directly with the water main and is furthermore exposed to the water vapour from the cistern, earth currents are established and the water cistern is to a certain extent electrically charged. To this must be added that owing to the construction of the float valve the quantity of water between the opening and closing of the float valve is after all very small and consequently the intermediate heater cannot be sufficiently filled with water so that a great deal of cold water reaches the cistern basin. Small quantities of water of a few litres cannot be stored by means of float valves.

All these disadvantages may be overcome if the hot water cistern itself serves as a regulating weight for the opening and closing of the water inlet valve, an electric intermediate heater being connected in the inlet pipe but not directly connected with the water main.

For further detailed description of the invention, reference is made to the accompanying drawings, illustrating several modified forms as examples, and wherein:

Figures 1 and 2 are vertical sections of the automatic liquid cistern illustrating the same as nearly empty and filled, respectively.

Figures 3 and 3$^a$ are detail views of the roller.

Figure 4 is also a detail view of a constructional form, as an example, of the valve control means.

Figure 5 is a vertical section through the axis of the roller.

Figures 6 and 7 are detail views illustrating positions of the spur wheel segments.

Figures 8 and 9 are vertical sections of the automatic liquid cistern illustrating the provision of an intermediate electrode heater.

Figures 10 and 11 are also vertical sections illustrating the automatic liquid cistern provided with an intermediate resistance heater.

The automatic liquid cistern works as follows:—

As soon as liquid is drawn out of the cistern $a$ by means of the tap 1 the weight of the cistern $a$ decreases and it is drawn up by means of the weight $b$ the roller $c$ and the chain $d$.

The roller $c$ is firmly connected with the inlet valve $e$ of the pipe $f$ containing the liquid.

By the rotation of the roller $c$ thereby taking place the valve $e$ is opened and the liquid flows into the cistern $a$ and through the pipe $k$ to the emptying tap $l$. If the emptying tap $l$ (Figure 2) is closed, then the cistern $a$ fills with liquid, sinks and draws up the weight $b$. The roller $c$ is caused to rotate and closes the inlet valve. The weight $b$ can be adjusted by means of the weight $z$ so that it acts according to the position of the liquid in the cistern $a$ and in this way automatically closes or opens the inlet valve $e$.

The cistern $a$ and the weight $b$ are centered by means of the guiding pieces $m$, $m_1$, $m_2$ and $m_3$.

The valve $n$ serves for cutting off the liquid and by means of it the automatic cistern is put out of action. In order to prevent too slow an opening and closing of the inlet valve $e$ the roller $c$ (Figures 1 and 2) is preferably made in the shape of an ellipse (Figures 3 and 3$^a$) instead of a circle. By means of the elliptical shape the transmission, that is, the commencing and ending rotation of the valve, is hastened (Figure 3) and with the position of the roller (according to Figure 3$^a$) retarded, as soon as the valve is sufficiently opened.

Figure 4 shows a constructional form as an example, in which the inlet valve $e$ is opened and closed by means of a lever arm $o$ and spur wheel transmission $p$ and $p_1$.

The weight $q$ serves to regulate the action of the lever.

Figures 5, 6 and 7 show a constructional form as an example in which the inlet valve $e$ is quickly opened by means of two spur wheels or segments of spur wheels with different transmission speeds, remains open as desired, and is again quickly closed. The spur wheel segments $s$ and $s_1$ (Figures 5 and 7) are shown in the position when the inlet valve $e$ is being quickly opened or closed respectively.

In this arrangement the spur wheel segments $r$ and $r_1$ (Figures 5 and 6) are disconnected. Owing to the rotation of the segments $s$ and $s_1$, they engage as soon as the inlet valve $e$ is opened sufficiently quickly, and open the valve further but more slowly by the opposite transmission ratio, until the valve is completely opened.

Figures 8 and 9 show the automatic cistern with an intermediate electrode heater indicated diagrammatically. Figures 10 and 11 show the automatic cistern with an intermediate heater with resistance coils.

The electric automatic hot water cistern works in the same way as above described.

As soon as hot water is drawn off through the tap 1 from the cistern $a$—which is preferably insulated to protect it from loss of heat—the weight of the cistern $a$ is reduced, and it is drawn upwards by means of the weight $b$ and the roller $c$ and chain $d$. The roller $c$ is in connection with the water inlet valve $e$ of the water pipe $f$.

By the rotation of the roller $c$ now taking place the water tap $e$ is opened and cold water flows into the intermediate heater $g$ which is connected with the electric conductor $h$. The water heated by the intermediate heater $g$ flows through the pipe $i$ to the cistern $a$ and thence through the pipe $k$ to the outlet tap $l$. If the outlet tap $l$ (Figure 9) is closed, the cistern $a$ fills with hot water and by its weight raises the weight $b$ thus rotating the roller $c$ and closing the water inlet valve $e$. As soon as water ceases to flow through the intermediate heater, the electric current is also switched off, if the heater is an electrode heater.

In this case also the above-mentioned transmission may be used.

Figure 10 shows a form of contruction as an example, in which the water cistern $a$ is fed from an intermediate heater with resistance coils $c$. With the use of intermediate heaters with heating coils it is necessary that the electric current for the intermediate heater should be switched off when no more water flows through the heater in order to prevent the burning out of the heating coils in the heater $t$.

This is attained by a device for breaking or making the current circuit, which is fitted on the roller *c* and is rigidly connected with the water inlet valve *e*.

Figure 10 shows the water inlet valve opened and with the wires *u* and $u_1$ lying on the contact pieces *v* and $v_1$ and conveying the electric current to the resistance coils of the heater *t*. If, however, the draw-off tap *l* is closed, the hot water rises in the cistern *a* and by means of its weight, when it is sufficiently filled, draws the weight *b* up and thus rotates the roller *c*. By means of this rotation the current supply wires *u* and $u_1$ are taken off the contact pieces *v* and $v_1$ automatically, thereafter resting on the insulating pieces *w* and $w_1$ and thus breaking the current supply by means of the movement of the hot water cistern, that is, of the roller (Figure 11).

What I claim and desire to secure by Letters Patent of the United States is:—

1. An automatic cistern for liquids, comprising a movable liquid container, a counterweight connected therewith, a liquid supply pipe, an electrical heater arranged between said container and said pipe, a valve associated with said pipe for controlling the flow of liquid therethrough, and means operating to close or open said valve on movement of said container due to the filling or emptying thereof.

2. An automatic cistern for liquids, comprising a movable liquid container connected with a counterweight, a liquid supply pipe, an electrical heater arranged intermediate said container and pipe, a valve in said pipe for controlling the flow of liquid to the container, and means operating to close or open said valve and close or open the electric circuit to said heater on movement of said container due to the filling or emptying thereof.

3. An automatic cistern for liquids, comprising a movable liquid container, a counterweight for said container, a valve for controlling the admission of liquid to the container, a sprocket connected to said valve and a chain engaging with said sprocket and connected to said container and counterweight whereby the valve is opened and closed by movement of said container due to the emptying and filling thereof.

4. An automatic cistern for liquids, comprising a movable liquid container, a counterweight for said container, a valve for controlling the admission of liquid to the container, gearing connected with said valve and connections between said gearing and said container and counterweight whereby the valve is opened and closed by movement of said container due to the emptying and filling thereof.

OTTO GRAETZER.